United States Patent
Bailey et al.

(10) Patent No.: US 11,919,430 B2
(45) Date of Patent: Mar. 5, 2024

(54) ENCAPSULATED FOIL LEATHER TRANSFER

(71) Applicant: LEAR CORPORATION, Southfield, MI (US)

(72) Inventors: Christopher Bailey, Warren, MI (US); Karl Rohr, Windsor (CA)

(73) Assignee: LEAR CORPORATION, Southfield, MI (US)

( * ) Notice: Subject to any disclaimer, the term of this patent is extended or adjusted under 35 U.S.C. 154(b) by 0 days.

(21) Appl. No.: 17/687,653

(22) Filed: Mar. 6, 2022

(65) Prior Publication Data

US 2022/0194276 A1    Jun. 23, 2022

Related U.S. Application Data

(62) Division of application No. 16/677,345, filed on Nov. 7, 2019, now abandoned.

(51) Int. Cl.
| | | |
|---|---|---|
| B60N 2/58 | (2006.01) | |
| B29C 59/00 | (2006.01) | |
| B32B 37/12 | (2006.01) | |
| B32B 38/06 | (2006.01) | |
| C09D 175/04 | (2006.01) | |
| C09J 7/28 | (2018.01) | |
| C09J 7/35 | (2018.01) | |

(52) U.S. Cl.
CPC ............ *B60N 2/5891* (2013.01); *B29C 59/00* (2013.01); *B32B 37/1207* (2013.01); *B32B 38/06* (2013.01); *C09D 175/04* (2013.01); *C09J 7/28* (2018.01); *C09J 7/35* (2018.01)

(58) Field of Classification Search
None
See application file for complete search history.

(56) References Cited

U.S. PATENT DOCUMENTS

| | | |
|---|---|---|
| 3,816,168 A | 6/1974 | Lewis et al. |
| 4,392,905 A | 7/1983 | Boyd et al. |
| 5,639,523 A | 6/1997 | Ellis |
| 5,843,263 A | 12/1998 | Mitchell |
| 8,852,719 B2 | 10/2014 | Fitch et al. |
| 2022/0195544 A1* | 6/2022 | Ruella ....................... C14B 7/02 |

FOREIGN PATENT DOCUMENTS

| | | |
|---|---|---|
| CN | 104831545 | 8/2015 |
| CN | 108715063 | 10/2018 |
| CN | 109433564 | 3/2019 |
| CN | 109863035 | 6/2019 |
| GB | 887584 | 1/1962 |

OTHER PUBLICATIONS

Machine translation of He CN 109433564 (Year: 2019).*

* cited by examiner

*Primary Examiner* — Robert T Butcher
(74) *Attorney, Agent, or Firm* — Brooks Kushman P.C.

(57) ABSTRACT

A leather product such as a leather covering for a vehicular part includes a segment of leather with a base coat applied to a hide side and a color coat applied to the base coat to create an intermediate stage leather segment. A foil transfer is embossed into and secured with an adhesive to the intermediate stage leather segment. A top coat is then applied to the foil transfer and a surrounding portion of the intermediate stage leather segment after the foil transfer is secured to complete the leather product. A system and method of making the leather product is also disclosed.

23 Claims, 3 Drawing Sheets

ENCAPSULATED FOIL LEATHER TRANSFER

CROSS-REFERENCE TO RELATED APPLICATIONS

This application is a division of U.S. application Ser. No. 16/677,345 filed Nov. 7, 2019, now abandoned, the disclosure of which is hereby incorporated in its(their) entirety by reference herein.

TECHNICAL FIELD

This disclosure relates to foil design elements on leather vehicular components and to a method of applying the foil design elements to leather vehicular components.

BACKGROUND

Automotive grade leather products are required to meet stringent performance and aesthetic requirements. To meet these requirements, one approach is to apply multiple waterborne coatings to form finish layers to the top surface of the leather.

The multiple coatings may include a basecoat/adhesion layer, a color coating, and one or more top coats. An example color coating may include about 30 to 50 wt. % polyurethane dispersions, about 0 to 20 wt. % acrylic dispersions, about 10 to 20 wt. % auxiliaries (including dulling agents, silicones, flow agents, defoamers, etc.), about 10 to 20 wt. % pigment dispersions, and up to about 5 wt. % isocyanate crosslinker. The one or more top coats typically contains about 5 to 10 wt. % silicone dispersions and up to about 10 wt. % of isocyanate crosslinkers. A foil design element may be then applied on top of the top coating.

The isocyanates are used to form an interpenetrating network with the polyurethane resins to ensure proper durability for automotive use. Other crosslinkers such as carbodiimides can be utilized, but isocyanates are the most prevalent due to their performance and cost. Silicones are typically in automotive leather top coat finishes for both durability and haptics. They help impart specific feels to the leather surface that would otherwise be lost due to finishing. Other polymer systems are possible for leather top coats, such as acrylics, but are rare due to issues with cold flex, yellowing, etc.

Generally, silicone dispersions and isocyanate crosslinkers in the top coating reduce adhesion properties of temperature-activated adhesives used to attach the foil design elements to leather surfaces. The reduction of adhesive properties may in turn prevent proper bonding of the foil design elements to the leather surface. As a result, typical adhesively-attached foil design elements applied over the one or more top coatings may fail to meet performance and aesthetic requirements when subjected to mechanical abrasion or wear.

This disclosure is directed to solving the above problems and other problems as summarized below.

SUMMARY

According to one aspect of this disclosure, a leather covering is disclosed for a vehicle part. The covering includes a segment of leather having a hide side and a flesh side. A base coat is applied to the hide side and a color coat is applied to the base coat to create a finished leather segment. A foil transfer is embossed into and secured with an adhesive to the finished leather segment and a top coat is applied to the foil transfer and a surrounding portion of the finished leather segment after the foil transfer is secured to the finished leather segment.

According to another aspect of this disclosure, the color coat may comprise about 30-55 wt. % polyurethane, about 0-20 wt. % acrylic, and up to about 15 wt. % additives as a dispersion on an aqueous solution, based on the total weight of the color coat. The color coat is free of isocyanates and silicones.

The adhesive securing the foil transfer may be a heat-activated adhesive that is heated while the foil transfer is being embossed into the finished leather segment.

The top coat may comprise about 5-10 wt. % silicon and up to about 10 wt. % isocyanate crosslinkers as a dispersion in an aqueous solution, based on the total weight of the top coat.

The top coat is free of any color pigmentation.

According to another aspect of this disclosure, a method is disclosed for applying a foil transfer to a leather component. The method comprises the steps of—
 applying a base coat to an outer side of a leather hide;
 applying a color coat over the base coat to create an intermediate finished leather segment;
 embossing the intermediate finished leather segment with a foil transfer having a heat-activated adhesive;
 heating the foil transfer to a threshold temperature to activate the adhesive and secure the foil transfer to the intermediate finished leather segment; and
 applying a top coat in a continuous layer over both the foil transfer and the color coat.

According to other aspects of the disclosed method, the color coat may comprise about 30-55 wt. % polyurethane, about 0-20 wt. % acrylic, and up to about 15 wt. % additives as a dispersion on an aqueous solution, based on the total weight of the color coat. The color coat is free of isocyanates and silicones.

The adhesive used to attach the foil transfer may be a heat-activated adhesive that is heated while the foil transfer is being embossed into the intermediate finished leather segment.

The top coat may comprise about 5-10 wt. % silicon and up to about 10 wt. % isocyanate crosslinkers as a dispersion in an aqueous solution, based on the total weight of the top coat.

The top coat used in the method is free of any color pigmentation.

According to another aspect of this disclosure, a vehicular foil transfer system is disclosed for a leather segment. The transfer system includes applying a base coat to one side of the segment. Applying a color coat, devoid of isocyanates and silicones, to the one side over the base coat. Providing a foil member having a heat-activated adhesive on a back side on a transfer plate that presses the foil member's back side into the one side of the segment to emboss the foil and leather segment. The transfer plate is heated to activate the adhesive and secure the foil to the leather segment over the color coat. A top coat is applied over the foil member and adjacent portions of the leather segment in a continuous layer.

In the transfer system, the color coat may comprise about 30-55 wt. % polyurethane, about 0-20 wt. % acrylic, and up to about 15 wt. % of additives as a dispersion on an aqueous solution, based on the total weight of the color coat.

In the transfer system, the top coat may comprise about 5-10 wt. % silicon and up to about 10 wt. % isocyanate crosslinkers as a dispersion in an aqueous solution, based on the total weight of the top coat. The top coat is free of any color pigmentation.

The above aspects of this disclosure and other aspects will be described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale, and some features may be exaggerated or minimized to show details of particular components. The specific structural and functional details disclosed are not to be interpreted as limiting, but as a representative basis for teaching one skilled in the art how to practice the disclosed concepts.

Except where expressly indicated, all numerical quantities in this description indicating dimensions or material properties are to be understood as modified by the word "about" in describing the broadest scope of the present disclosure.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Reference is being made in detail to compositions, embodiments, and methods of embodiments known to the inventors. However, disclosed embodiments are merely exemplary of the present invention which may be embodied in various and alternative forms. Therefore, specific details disclosed herein are not to be interpreted as limiting, rather merely as representative bases for teaching one skilled in the art to variously employ the present invention.

The description of a group or class of materials as suitable for a given purpose in connection with one or more embodiments implies that mixtures of any two or more of the members of the group or class are suitable. Description of constituents in chemical terms refers to the constituents at the time of addition to any combination specified in the description, and does not necessarily preclude chemical interactions among constituents of the mixture once mixed.

Figure 1:
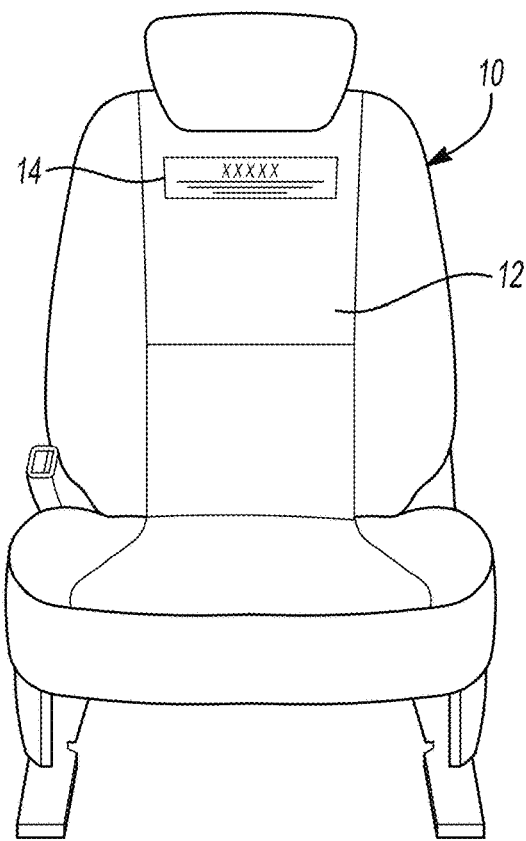
FIG. 1 is a front elevation view of a vehicle seat having a foil transfer applied to the front surface of the seat back made according to this disclosure.

In one or more embodiments, a leather covering is disclosed. The leather covering 12 may be a vehicular covering such as an automotive leather covering. Other types of vehicles are contemplated. Non-limiting exemplary types of vehicles include land vehicles such automobiles, buses, vehicles for transportation of goods, motorcycles, off-road vehicles, track vehicles, trains, amphibious vehicles, aircraft, watercraft, or the like. The leather covering 12 may be included in or as a vehicle interior or exterior part. Referring to FIG. 1, a vehicle seat 10 is illustrated as a non-limiting example of a part having a leather covering 12.

The leather covering 12 may be made completely or partially from a leather material. The leather material may be created by tanning animal rawhide or skin. Alternatively, the leather material may be generated from non-animal sources. The leather covering may be entirely or at least partially an artificial leather covering.

As can be seen in FIG. 1, an example foil design element, member, applique, or transfer 14 is shown applied to the leather covering 12 according to one or more aspects of this disclosure. The transfer 14 may be a metallic foil such as aluminum or tin foil or a pigmented foil material. The foil transfer 14 may have a release paper on one side from which the foil material is removed during the application process such as embossing. The foil transfer 14 may have a protective sheet on the opposite side to protect the foil material. The protective sheet may be removed before the foil is applied to the leather surface. The transfer 14 may have any shape, size, configuration, color, texture, or a combination thereof. The transfer 14 includes a temperature-activated adhesive on its surface such as a back side. Adhesives may be polyester, ethylene-vinyl acetate (EVA), hot-melt pressure sensitive adhesive such as styrenic block polymers (SBCs), or heat-set epoxies.

Figure 2A:
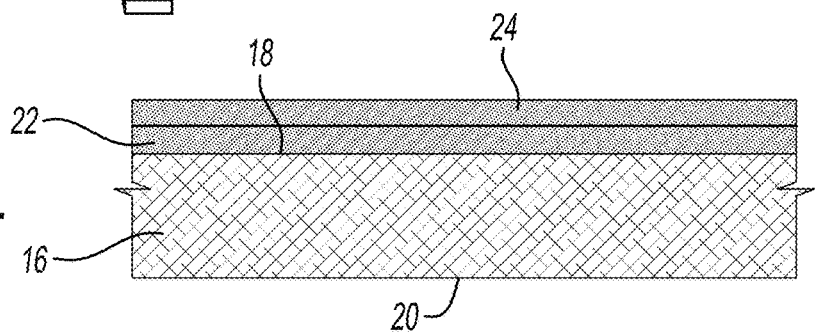
FIG. 2A is an enlarged diagrammatic cross-section of a segment of leather having a base coat and a color coat applied to the hide-surface of the leather.
Figure 2B:
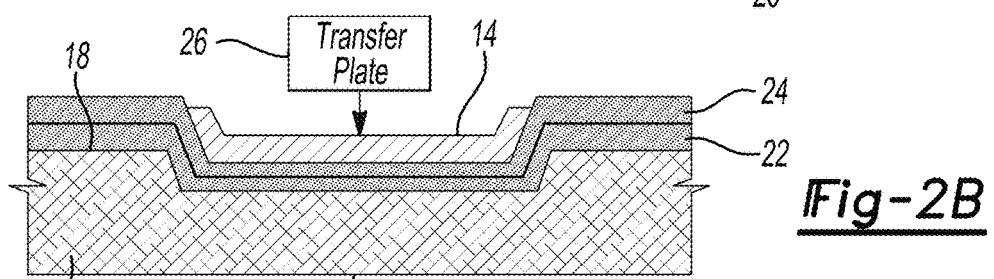
FIG. 2B is an enlarged diagrammatic cross-section of the segment of leather with a foil transfer embossed into and adhered to the leather after the leather has been coated with the base coat and the color coat.
Figure 2C:
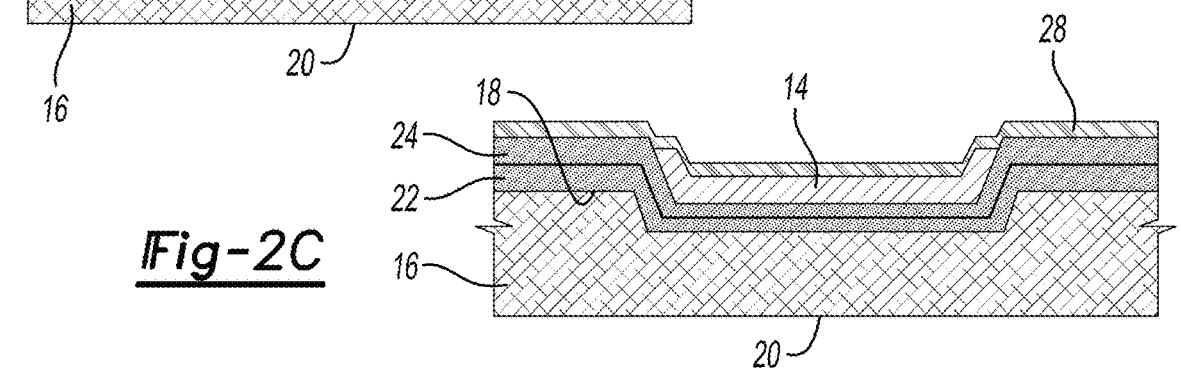
FIG. 2C is an enlarged diagrammatic cross-section of the segment of leather after the foil transfer is embossed into and adhered to the leather with at least one top coat applied over the foil applique.

Referring to FIGS. 2A-2C, a leather segment 16 having a hide side 18 and a flesh side 20 is shown in a diagrammatic cross section. A base coat 22 may be applied to the hide side 18 by rolling or another coating application technique. A color coat 24 may be applied over the base coat 22 by spraying or another coating application technique. A foil transfer 14 may be adhesively attached over the color coat 24 with a transfer plate 26 that is heated to activate the adhesive on the foil transfer 14. A top coat 28 is applied over the foil transfer 14 and over the surrounding portions of the color coat 24. The top coat 28 may be applied by roll coating, curtain coating, meniscus coating, spray coating, the like, or a combination thereof.

Figure 3:
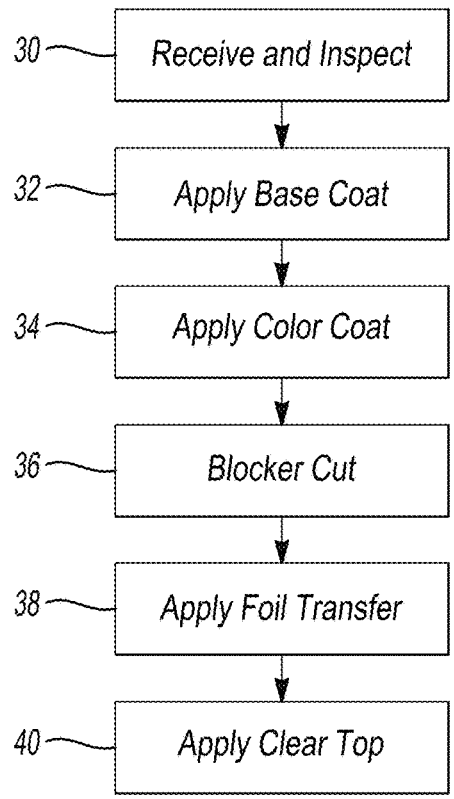
FIG. 3 is a flowchart illustrating the process for providing an encapsulated foil applique on a leather covered vehicular part.

Referring to FIG. 3, a flowchart of the steps in the disclosed process is provided. Some of the steps are optional. The process may begin with receiving and inspecting a leather hide at 30. A portion of or the entire hide side of the leather hide may be then coated at 32 with the base coat 22 by a rolling or another suitable technique. The base coat may include polyurethane and acrylic binders, additives, and pigmentation. The thickness of the base coat may be 15 to 100 microns wet. The base coat 22 may form a continuous or discontinuous layer. The base coat 22 may have one or more layers.

The color coat 24 may be then applied, for example by spraying, painting, or dipping over the base coat 22 at 34. Subsequently, the leather hide may be cut into segments or leather blockers 16 of the desired shape in a blocker cut operation at 36. The leather segment 16 may be then placed in a press or other tool that applies the foil transfer 14 onto the color coat at 38. Once the color coat 24 is applied onto the base coat 22, the method may include embossing the foil transfer 14 into the leather surface with the temperature-activated adhesive described above. The adhesive may be applied by embossing, pressing, spraying, painting, or another technique.

The method may include loading the foil transfer 14, including the adhesive, onto a transfer plate 26, which may be a part of the press or tool. The method may further include heating the transfer plate 26 to at least a threshold temperature needed to activate the adhesive of the foil transfer 14 or to a higher temperature. The threshold temperature may be about 150 to 450, 200 to 400, or 275 to 350° F. The transfer plate 26 may deliver the foil transfer 14 onto the color coat before or after the heating step. The press or tool may apply the foil transfer 14 onto the color coat 24. The application may be by embossing, etching, punching, stamping, or otherwise providing the foil transfer 14 onto the surface of the color coat 24, either flush with the surface of the color coat 24 or embedded into the surface.

The transfer plate 26 may be a patterned plate such that the plate contains lettering, a design or image to be transferred to the color coat 24 of the leather surface. The segment 16 may be placed beneath the plate 26. A foil material having a release paper may be placed between the color coat 24 of the leather segment 16 and the plate 26, the release paper being on the plate 26 side and the foil material on the color coat 24 side. The plate 26 may be heated to the threshold temperature. The heated plate 26 may be then stamped into the color coat at 10 to 100, 20 to 90, or 30 to 80 PSI and held in place for about 0.1 to 10, 0.2 to 8, or 0.5 to 5 seconds. To achieve a greater depth of the embossed design into the leather surface, higher the pressure may be applied. To increase adhesion and/or thickness of the foil transfer, pressure may be applied for an extended period of time in excess of the time period mentioned above. Subsequently, the transfer plate 26 may be released from the leather surface and the release paper may be removed.

A top coat 28 may be then applied, for example by spraying or another technique named herein, over the foil transfer 14 and the surrounding portions of the color coat 24 of the leather segment 16 at 40. The color coat 24 application precedes application of the foil transfer 14, and the top coat 28. The foil transfer 14 application occurs before the top coat 28 is applied over the foil transfer 14 and the color coat 24.

Without limiting the disclosure to a single theory, it is believed that good adhesion of the foil transfer to the leather material is achieved by providing the foil transfer 14 on top of the color coat 24, and applying a clear top coat 28 over the foil transfer 14.

Additionally, the chemistry of the color coat 24 is formulated to improve foil adhesion by excluding components which may prevent good adhesion such as isocyanates and silicones. The color coat 24 may be a water-born color coating. The formula for the color coat 24 may comprise, consist of, or essentially consist of about 30 to 55, 35 to 50, or 40 to 45 wt. % polyurethane dispersion, about 0 to 20, 5 to 15, or 10 to 12.5 wt. % acrylic dispersion, about 10 to 20, 12 to 18, or 14 to 16 wt. % pigment dispersion, and up to about 15 wt. % additives such as 0 to 15, 2 to 15, or 5 to 10 wt. % additives named above, based on the total weight of the color coat 24. Isocyanate crosslinkers may be entirely eliminated or reduced to zero and silicones may be likewise absent in the disclosed color coat 24 chemistry. The herein-disclosed color coat 24 may be thus entirely free or substantially free from substances which are believed to contribute to foil adhesion failure, as was described above. The color coat may be thus entirely or substantially free from silicones, isocyanates, or both. Substantially free means that the respective layer or coat includes less than about 1, 0.9, 0.8, 0.7, 0.6, 0.5, 0.4, 0.3, 0.2, 0.1, 0.09, 0.08, 0.07, 0.06, 0.05, 0.04, 0.03, 0.02, 0.01, or less wt. % of isocyanates or silicones, based on the total weight of the respective layer or coat.

The color coat 24 may have one or more layers. Each layer may have the same or different chemistry such that the layers may differ by composition, amount of at least one of the components, or both. The number of layers may be 1-10, 1 to 8, or 1 to 4. The thickness of each layer of the color coat 24 may be between about 10 to 45 microns wet. The color coat 24 may form a continuous or discontinuous layer.

Attachment of the foil transfer onto the leather surface is further enhanced by providing a top coat 28 over the foil transfer 14, one or more surface portions surrounding the foil transfer 14, or both. The top coat 28 may be applied over the foil transfer 14, thus encapsulating the foil transfer 14 within the finishing system with a durable, scratch resistant surface. The top coat 28 may have one or more layers. The number of layers may be 1-10, 2 to 8, or 3 to 6. The thickness of the top coat 28 may be between about 10 to 45 microns wet. The top coat 28 may be clear, transparent, or translucent such that the foil transfer 14 design is visible through the top coat 28. The top coat 28 may be free of any color pigmentation.

The top coat 28 may be a polyurethane dispersion-based coating. The top coat 28 may contain silicone dispersions in the amount of about 5 to 10, 6 to 9, or 7 to 8 wt. % and/or isocyanates in the amount of up to about 10 wt. % or about 0 to 10, 2 to 8, or 4 to 6 wt. %, based on the total weight of the top coat. The top coat 28's chemistry provides increased mechanical and physical properties such as good durability and haptics to the leather covering 12. The top coat 28 may form a continuous or discontinuous layer. The top coat 28 may be applied over the entire foil transfer 14 and only a portion of or the entire surface of the color coat 24. The portion may be about 10, 15, 20, 25, 30, 35, 40, 45, 50, 55, 60, 65, 70, 75, 80, 85, 90, 95, 99, or more % of the color coat. The portion may be large enough to cover the entire surface of the foil transfer to encapsulate the entire foil transfer between the color coat and the top coat. The portion may be only or predominantly in the vicinity of or surrounding the foil transfer.

EXAMPLES

Example 1 and Comparative Examples A, B

Example 1 was prepared according to the method described above. Example 1 included a leather covering having a base coat, a color coat, and a foil transfer applied onto the surface of the color coat. No top coat was applied.

Figure 4A:
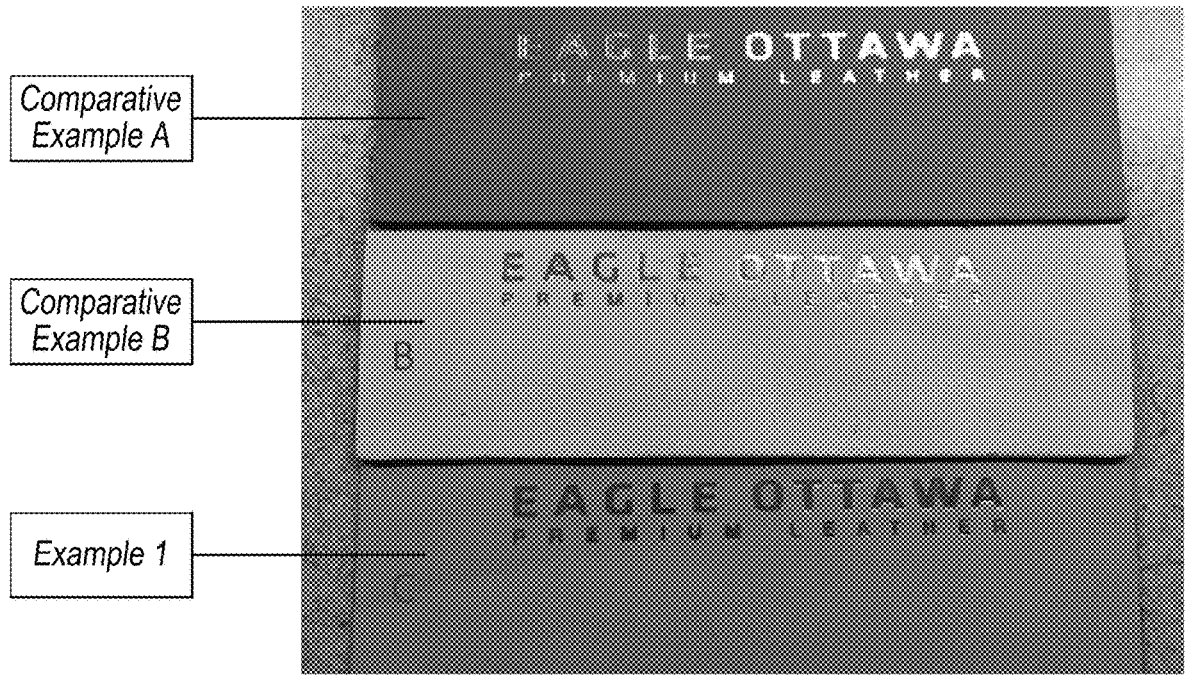
FIG. 4A shows Example 1 and Comparative Examples A and B after foil transfer application onto the color coat surface.

Comparative Examples A and B were prepared by applying a foil transfer on top of a polyurethane-based color coat including isocyanates crosslinkers in the amount of 1% and silicone dispersions in the amount of 2-4%. No top coat was applied. Example 1 and Comparative Examples A and B after the foil transfer application are depicted in FIG. 4A.

Figure 4B:
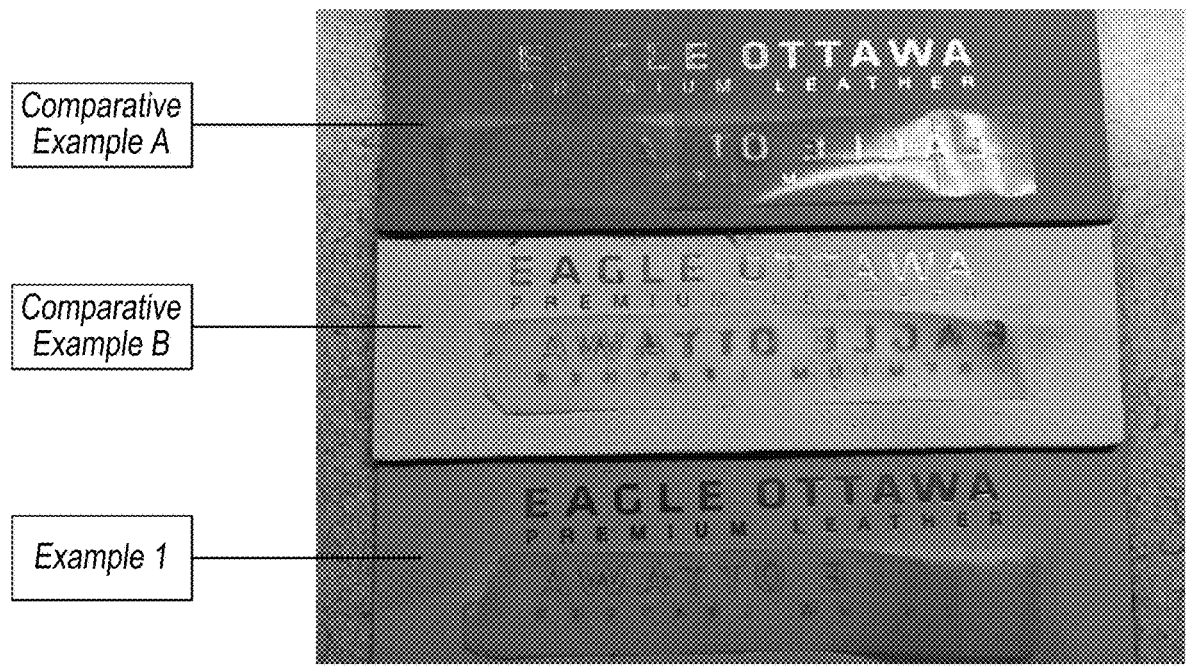
FIG. 4B shows tape application onto Example 1 and Comparative Examples A and B.
Figure 4C:
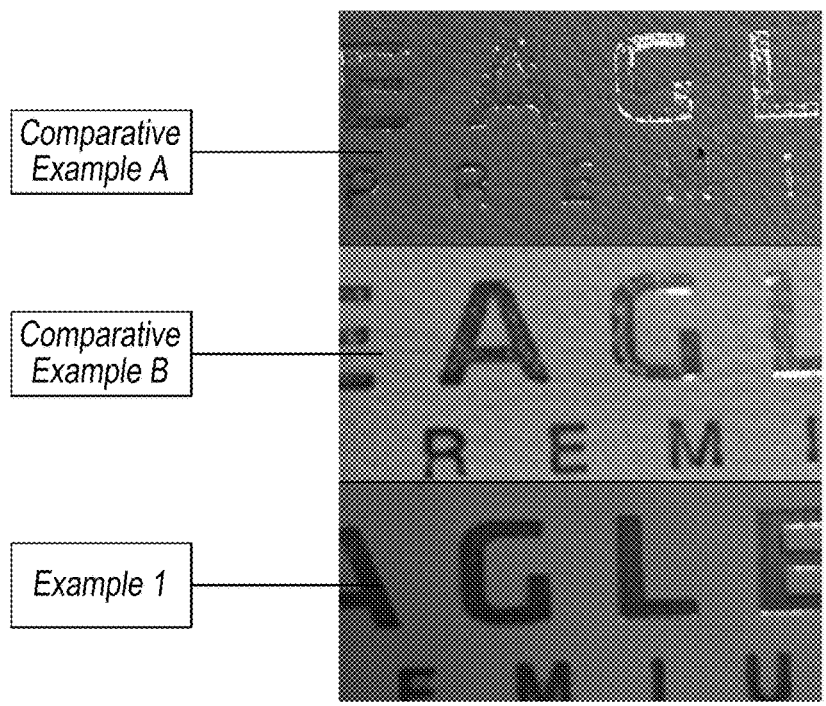
FIG. 4C shows a close-up of Example 1 and Comparative Examples A and B after the tape applied in FIG. 4B was pulled off of the foil transfer surface.

Example 1 and Comparative Examples A and B were tested by applying a piece of an adhesive tape (3M Scotch tape) over the entire foil surface and pulling the tape off at a 45° angle 30 seconds after the tape application. Example 1 and Comparative Examples A and B were subsequently visually assessed. The test results can be seen in FIGS. 4B and 4C, which show that Example 1 exhibits good foil transfer adhesion and retention while Comparative Examples A and B show that the tape removed relatively large sections of the foil transfer upon contact, illustrating adhesion failure of the foil transfer on the color coat containing isocyanates and silicones.

Examples 2, 3 and Comparative Examples C, D

Additional tests were conducted on two Examples 2 and 3 and Comparative Examples C and D. Examples 2 and 3 were prepared according to the method described above. Examples 2 and 3 each included a leather covering having a base coat, a color coat, a polyurethane-based top coat, and a foil transfer applied onto the surface of the color coat prior to application of the top coat over the foil transfer and portions of the color coat surrounding the foil transfer. The foil transfer was encapsulated between the color coat and the top coat.

Comparative Examples C and D were prepared by applying a base coat, color coat, and top coat onto the leather material before the foil transfer was applied on top of the polyurethane-based top coat. The foil transfer was not covered with an additional coat and formed the top layer of the leather covering.

Examples 2, 3 and Comparative Examples C, D were tested by a Crock test (dry rub 250 cycles) measuring transference of the foil transfer from the leather surface to another material. The Crock test was performed as per ISO test method 105-X12

Examples 2, 3 and Comparative Examples C, D were also tested for UV fade resistance at 225.6 KJ and 488.8 KJ. The test for UV fade resistance was the Society of Automotive Engineers' standard J2412.

Results of the testing are summarized in Table 1 below. A visual rating scale of 1 to 5 with 1 being the worst and 5 being the best was used to evaluate the results.

TABLE 1

Crocking and UV fade resistance of Examples 2, 3 and Comparative Examples C, D

| Test | Example 2 | Example 3 | Comparative Example C | Comparative Example D |
|---|---|---|---|---|
| Crock - Dry 250 cycle | 5 | 5 | 5 | 4-5 |
| Crock - Dry 250 cycle | 5 | 4-5 | 4-5 | 4-5 |
| UV Fade Resistance - 225.6 KJ | 4-5 | 4-5 | 4 | 4 |
| UV Fade Resistance - 488.8 KJ | 4-5 | 4-5 | 3-4 | 3-4 |

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A covering for a vehicle part, comprising:
   a segment of a leather comprising a hide side and a flesh side;
   a base coat applied to the hide side;
   a color coat applied to the base coat to create a finished leather segment;
   a foil transfer embossed into and secured with an adhesive to the color coat of the finished leather segment; and
   a top coat applied to the foil transfer and a surrounding portion of the color coat of the finished leather segment after the foil transfer is secured to the finished leather segment.

2. The covering of claim 1, wherein the color coat comprises a formulation in a range of, 30-55 wt. % polyurethane, 0-20 wt. % acrylic, and 0-15 wt. % additives as a dispersion on an aqueous solution, based on total weight of the color coat.

3. The covering of claim 1, wherein the color coat comprises a formulation in range of 1-0.01 wt. % of isocyanates and silicones, based on total weight of the color coat.

4. The covering of claim 1, wherein the adhesive is a heat-activated adhesive that is heated while the foil transfer is embossed into the finished leather segment.

5. The covering of claim 1, wherein the top coat comprises in a range of, 5-10 wt. % silicon and 0-10 wt. % isocyanate crosslinkers as a dispersion in an aqueous solution, based on total weight of the top coat.

6. The covering of claim 1, wherein the top coat is free of any color pigmentation.

7. A vehicular foil transfer system comprising:
   a leather segment;
   a base coat applied to one side of the leather segment;
   a color coat, devoid of isocyanates and silicones, applied to the one side over the base coat;
   a foil member having a heat-activated adhesive on a back side;
   a transfer plate that presses a back side of the foil member into the one side of the segment to emboss the foil member and leather segment, wherein the transfer plate is heated to activate the heat-activated adhesive and secure the foil to the leather segment over the color coat; and
   a top coat applied over the foil member and adjacent portions of the leather segment in a continuous layer.

8. The vehicular foil transfer system of claim 7, wherein the color coat comprises about 30-55 wt. % polyurethane, about 0-20 wt. % acrylic, and up to about 15 wt. % of additives as a dispersion on an aqueous solution, based on total weight of the color coat.

9. The vehicular foil transfer system of claim 7, wherein the top coat comprises about 5-10 wt. % silicon and up to about 10 wt. % isocyanate crosslinkers as a dispersion in an aqueous solution, based on total weight of the top coat.

10. The vehicular foil transfer system of claim 7, wherein the top coat is free of any color pigmentation.

11. The covering of claim 1, wherein the adhesive is one of: ethylene-vinyl acetate (EVA), hot-melt pressure sensitive adhesive, styrenic block polymers (SBCs), and heat-set epoxies.

12. The covering of claim 1, wherein the foil transfer is adhesively secured to the color coat with a transfer plate.

13. The covering of claim 1, wherein the foil transfer is one of a metallic foil or a pigmented foil material.

14. The covering of claim 1, wherein a thickness of the top coat is in a range of 10-45 microns wet.

15. The covering of claim 1, wherein the color coat corresponds to a water-born color coating.

16. A seat covering comprising: a segment of leather comprising a hide side and a flesh side; a base coat applied to the hide side: a color coat applied to the base coat to create a finished leather segment; and a foil transfer embossed into and secured with an adhesive to the color coat of the finished leather segment and a top coat applied to the foil transfer.

17. The seat covering of claim 16 further comprising, a top coat applied to the foil transfer and a surrounding portion of the color coat of the finished leather segment upon securing the foil transfer to the finished leather segment.

18. The seat covering of claim 16, wherein the adhesive is one of: ethylene-vinyl acetate (EVA), hot-melt pressure sensitive adhesive, styrenic block polymers (SBCs), and heat-set epoxies.

19. The seat covering of claim 16, wherein the foil transfer is one of a metallic foil or a pigmented foil material.

20. The seat covering of claim 16, wherein the color coat comprises a formulation in a range of, 30-55 wt. % polyurethane, 0-20 wt. % acrylic, and 0-15 wt. % additives as a dispersion on an aqueous solution, based on total weight of the color coat.

21. The seat covering of claim 16, wherein the color coat comprises 1-0.01 wt. % of isocyanates and silicones, based on total weight of the color coat.

22. The seat covering of claim 16, wherein the color coat corresponds to a water-born color coating.

23. A method, comprising:
applying a base coat to a hide side of a leather segment;
applying a color coat to the base coat to create a finished leather segment;
embossing a foil transfer into the finished leather segment and securing with a temperature activated adhesive to the color coat of the finished leather segment; and
applying a top coat to the foil transfer and a surrounding portion of the color coat of the finished leather segment after the foil transfer is secured to the finished leather segment.

\* \* \* \* \*